United States Patent [19]

Sciuto

[11] Patent Number: 4,637,881
[45] Date of Patent: Jan. 20, 1987

[54] FILTER DRIER

[75] Inventor: George J. Sciuto, St. Louis County, Mo.

[73] Assignee: Emerson Electric Co., St. Louis, Mo.

[21] Appl. No.: 677,934

[22] Filed: Dec. 3, 1984

Related U.S. Application Data

[63] Continuation of Ser. No. 480,225, Mar. 30, 1983, abandoned.

[51] Int. Cl.⁴ .................... B01D 27/02; F25B 43/00
[52] U.S. Cl. .................................. 210/689; 62/474; 210/289; 210/291; 210/446; 210/456; 210/806; 210/DIG. 6
[58] Field of Search ............... 55/316, 418, 482, 509, 55/DIG. 17; 62/474, 475; 210/264, 266, 282, 283, 285, 287, 289, 290, 291, 435, 446, 451, 456, DIG. 6, 689, 806

[56] References Cited

U.S. PATENT DOCUMENTS

| | | | |
|---|---|---|---|
| 2,325,657 | 8/1943 | Burkness | 210/DIG. 6 X |
| 2,583,812 | 1/1952 | Briggs et al. | 210/DIG. 6 X |
| 3,170,872 | 2/1965 | Balogh et al. | 210/DIG. 6 X |
| 3,815,752 | 6/1974 | Hoffman et al. | 210/289 X |
| 4,029,580 | 6/1977 | Lange | 210/264 X |
| 4,177,145 | 12/1979 | Schumacher | 210/266 X |
| 4,209,401 | 6/1980 | Henton | 210/266 X |
| 4,364,756 | 12/1982 | Clarke et al. | 210/282 X |

Primary Examiner—Richard V. Fisher
Assistant Examiner—W. Gary Jones
Attorney, Agent, or Firm—Polster, Polster and Lucchesi

[57] ABSTRACT

A filter drier is disclosed for installation in a liquid refrigerant line of a refrigeration system, the filter drier comprising a housing having an inlet at one end thereof and an outlet at the other end thereof. The liquid refrigerant is discharged from the inlet into the housing in a jet and a perforate plate is provided within the housing against which this jet impinges for diffusing the refrigerant jet substantially across the width of the housing. A filter filters the diffused liquid refrigerant and a bed of desiccant beads is provided with a perforate divider between the filter and the desiccant. A perforate support plate supports the desiccant bed and a second filter bears on the downstream perforate support plate with the desiccant being engageable with the second filter. A spring is interposed between the perforate divider and the housing upstream from the desiccant bed so that the spring applies a resilient, compressive force on the desiccant bearing on the second filter thereby to maintain the desiccant beads in a compacted state such that the diffuser plate and the first filter prevents the jet of liquid refrigerant from impinging directly on the desiccant beads thereby to substantially prevent movement of the beads relative to one another with attendant breakage or chipping of the desiccant beads.

4 Claims, 3 Drawing Figures

FILTER DRIER

This is a continuation of application Ser. No. 480,225, filed Mar. 30, 1983, now abandoned.

BACKGROUND OF THE INVENTION

This invention relates to a filter drier for the refrigerant of a refrigeration system, and more particularly, relates to a filter drier for installation in a liquid line of a refrigeration system for filtering and drying the refrigerant when the refrigerant is in a liquid state.

A refrigeration system, such as in an air conditioner or in a refrigeration unit, normally utilizes a filter drier for removing moisture and acids from the refrigerant and for filtering particles of metal, dirt, or grit from the refrigerant thereby to prevent damage to operation of the compressor and other components of the refrigeration system having movable parts or close tolerances. Typically, such a refrigerant filter drier unit includes a desiccant bed of beads of a suitable desiccant material, such as alumina, activated carbon, or other materials known to those skilled in the art. Further, filter pads of a suitable inorganic fibrous material is usually provided for removing of particulate material from the refrigerant.

Filter drier units, such as shown in U.S Pat. No. 4,364,756, are intended for use in a refrigerant suction line in which gaseous or vapor refrigerant enters the filter, passes through the filter and desiccant media, and is returned to the suction side of the refrigeration compressor.

In other types of refrigerant filter driers, such as shown in U.S Pat. Nos. 3,815,752 and 4,209,401, refrigerant enters the housing of the filter drier unit and impinges directly on a perforate plate in front of a bed of desiccant beads. A fibrous filter is provided downstream of the desiccant. Additionally, bi-directional filter drier units are known for use in heat pumps or the like where the flow of the refrigerant is reversed, depending on whether the heat pump is operating in its heating or cooling mode. Such bi-directional flow of filter drier units are shown in U S. Pat. Nos. 4,029,580 and 4,177,145. However, as was the case in regard to the single directional flow filter drier shown in the above-noted U.S Pat. Nos. 3,815,752 and 4,209,401, the refrigerant in the above-mentioned bi-directional filter drier units first came into contact with the bed of beaded desiccant prior to being filtered by the inorganic fibrous filter media.

In such filter drier units as described above, particularly wherein a liquid (as opposed to a gaseous) refrigerant is filtered, the impingement of the incoming jet of liquid refrigerant on the compacted bed of desiccant beads caused additional compaction and movement of the beads relative to one another, especially on startup and shutdown of the flow of refrigerant. This was true even if the desiccant beads were compacted and vibrated prior to assembly of the filter drier and even though the desiccant beads are maintained in their compacted state by means of a compression spring. Moreover, if any extra space or volume existed within the bed of desiccant beads, the impingement of the flow of liquid refrigerant causes movement of the beads relative to one another, known as roiling, and the relative movement of the hard desiccant beads causes small particles or flakes of the desiccant beads to flake off which in turn must be trapped by the downstream filters. Of course, as more of the desiccant beads flake off, more free space exists within the desiccant bed thereby to permit more movement of the desiccant beads relative to one another which encourages still more flaking. Thus, over a period of time, a substantial amount of the desiccant beads would be removed by flow erosion and these flaked desiccant particles would tend to become trapped on the downstream filter pads thus, at least in part, blocking the flow of refrigerant through the filter drier unit and increasing the pressure drop across the filter drier unit. Additionally, if pieces of the flaked off desiccant escape through the downstream filter means, these hard particles of desiccant could do damage to compressor parts and other close tolerance, movable parts (e.g., the thermal expansion valve) within the refrigerant unit. Additionally, an increased pressure drop across the filter drier unit may result which could adversely affect the operation of the refrigeration system.

Thus, there has been a longstanding need for a filter drier unit for application in a liquid refrigerant line in which the roiling effect of the compacted desiccant beads is minimized.

SUMMARY OF THE INVENTION

Among the several objects and features of the present invention may be noted the provision of a filter drier unit, generally as above described, for installation in the liquid line of a refrigeration system for filtering and drying the liquid refrigerant passing therethrough;

The provision of such a filter drier which improves the flow and filtration characteristics of the refrigeration system;

The provision of such a filter drier unit which minimizes roiling erosion of the desiccant;

The provision of such a filter drier unit which is of fail-safe construction such that desiccant cannot escape from either the inlet or the outlet of the filter drier unit;

The provision of such a filter drier unit in which the inlet flow of liquid refrigerant is diffused before the liquid refrigerant flows through the desiccant thus exposing more of the desiccant's surface to refrigerant flow and enhancing the adsorption characteristics of the desiccant;

The provision of such a filter drier unit in which the flow of the liquid refrigerant aids in the compaction of the desiccant and cooperates with (instead of working against) the action of a compression spring within the filter drier unit;

The provision of such a filter drier unit in which even small particles of desiccant are retained within the filter drier unit; and The provision of such a filter drier unit which is of compact size, which is readily and economically manufactured, which is relatively easy to assemble during manufacture, which has an increased service life, and which effectively protects the refrigeration system against moisture, acids, and particulate dirt flowing through the refrigerant.

Briefly stated, a filter drier of the present invention is intended for installation in a liquid line of a refrigeration system. The filter drier unit comprises a housing having an inlet at one end thereof and an outlet at the other end thereof. The liquid refrigerant is discharged from the inlet into the housing in the form of a jet and means within the housing is provided against which this jet of refrigerant impinges for diffusing the refrigerant jet substantially across the cross-section or width of the housing. Means for filtering the diffused liquid refrigerant is provided together with a bed of desiccant beads. A perforate divider plate is provided between the filter means and the desiccant bed and another perforate support plate is provided within the housing so as to support the desiccant bed at the downstream end thereof. A second filter means bears on the downstream perforate support plate with the desiccant bed being engagable with the second filter means. A spring is interposed between the perforate divider and the housing upstream from the desiccant bed wherein the spring applies a resilient compressive force on the desiccant bed bearing on the second filter thereby to maintain the desiccant beads in a compacted state and wherein the diffusing means and the first filter prevents the jet of liquid refrigerant from impinging on the desiccant beads and thus substantially prevents movement of the desiccant beads relative to one another with attendant erosion or breaking of the desiccant beads.

The method of this invention of filtering a liquid refrigerant flowing through a refrigerant line of a refrigeration system comprises the steps of flowing a jet of liquid refrigerant into the filter housing from an inlet, the filter housing having a substantially larger cross-section than the refrigerant line. The jet of liquid refrigerant is diffused substantially uniformly across the cross-section or width of the housing. Then the diffused liquid refrigerant is filtered. The diffused, filtered liquid refrigerant is then passed over a bed of desiccant and is exhausted from the filter drier housing.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 3:
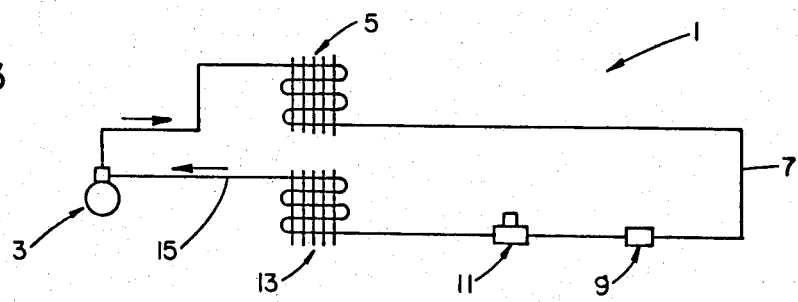
FIG. 3 is a schematic view of a typical refrigeration system illustrating a filter drier unit of the present invention installed in a liquid line of the refrigeration system.

Referring now to the drawings, and particularly to FIG. 3, a typical refrigeration system is illustrated in its entirety by reference character 1. The refrigeration system includes a compressor 3 which supplies a hot, typically gaseous refrigerant under high pressure to a condenser coil 5. Excess heat is given off by the condenser coil and liquid refrigerant under high pressure exits the condenser coil and is carried by a liquid refrigerant line 7. In accordance with this invention, a filter drier unit, as generally indicated at 9, is provided in liquid refrigerant line 7 upstream from a thermostatic expansion valve 11. The high pressure, liquid refrigerant is adiabatically expanded by the thermal expansion valve and is directed through an evaporator coil 13 where the refrigerant absorbs heat from the surroundings of the evaporator coil. Typically, a superheated refrigerant vapor exits evaporator coil and is returned to the inlet or suction port of compressor 3 by means of a suction line 15.

Figure 1:
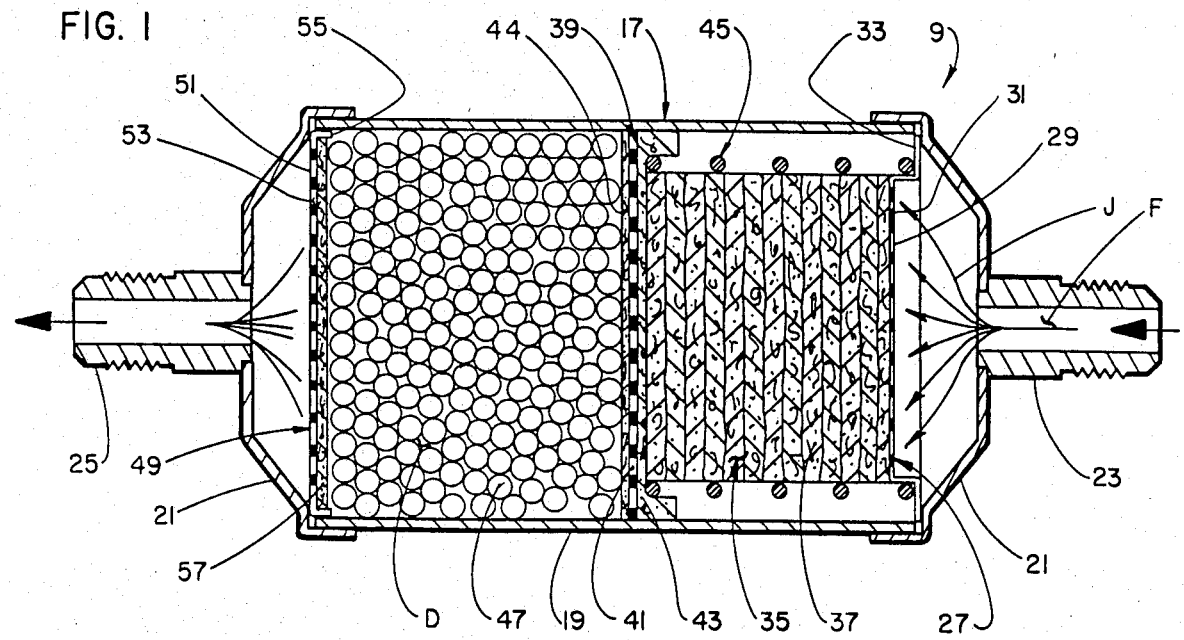
FIG. 1 is a longitudinal cross-sectional view of a first embodiment of a filter drier of the present invention.

Referring now to FIG. 1, a first embodiment of the filter drier of the present invention is illustrated. More particularly, filter drier unit of the present invention 9 includes a housing, as generally indicated at 17, comprising a generally cylindric body shell 19 having a shell head 21 sealingly secured (e.g., brazed or welded) to the ends of the shell head. One of the shell heads (i.e., the righthand shell head as shown in FIG. 1) is provided with a central inlet fitting 23 which is adapted to be connected to liquid line 7 and to receive liquid refrigerant. The downstream shell head 21 is provided with an outlet fitting 25 which is adapted to be connected to the inlet of thermostatic expansion valve 11, for example. It will be noted that the cross-sectional area of filter drier body shell 19 is considerably greater than liquid line 7.

As shown at the righthand end of FIG. 1, the liquid refrigerant entering the interior of housing 17 from inlet fitting 23 is in the form of a jet J of liquid refrigerant. The jet of liquid refrigerant encounters a first or upstream diffuser plate, as generally indicated at 27, so as to substantially uniformly diffuse the refrigerant jet across the cross-section or width of the diffuser plate which, in essence, is nearly as large as the cross-section or width of shell body 19. The diffuser plate includes a plate body 29 having a plurality of perforate holes 31 therein. Plate body 29 is provided with an outer flange 33 which in turn is secured with respect to housing 17 between one end of cylindrical shell body 19 and the inlet shell head 21.

On the downstream face of plate body 29, a first or primary filter, as generally indicated at 35, is provided. More specifically, filter 35 is constituted by a plurality of pads 37 of fibrous, inorganic material such as is well known to those skilled in the filter drier art, with the plurality or stack of pads 37 constituting a primary filter body.

At the downstream face of filter 35, a perforate divider plate 39 is provided. This perforate divider plate is movable axially relative to shell body 19. The perforate divider plate 39 has a plurality of holes 41 therethrough and a filter pad 43 constituting a portion of filter 35 is supported on the upstream face of perforate divider plate 39 and constitutes the last or downstream filter pad of filter 35.

As generally indicated at 45, a compression coil spring is provided on the exterior of filter 35 and is interposed between the upstream face of divider plate 39 and the downstream face of diffuser plate 27 thereby to resiliently bias divider plate 39 toward outlet 25 for purposes as will appear. In this manner, as shown in FIG. 1, spring 45 is free of the primary filter body such that the primary filter body is substantially free of any lengthwise (axial) compaction by the spring.

As generally indicated by reference character D, a desiccant bed of compacted desiccant beads 47 is provided within shell body 19. Desiccant beads 47 may be of any suitable desiccant material such as alumina, activated carbon, or other material such as is typically utilized in filter drier units for adsorbing moisture, acid and other contaminants from the refrigerant flowing therethrough. As is typical, desiccant beads 47 may be hard, ceramic-like materials and the desiccant bed D is typically compacted as it is installed within filter drier 9 of the present invention so as to remove as much interstitial space as possible from between the beads thereby to eliminate, to as great a degree as possible, relative movement between the desiccant beads when refrigerant flows therethrough.

Figure 2:
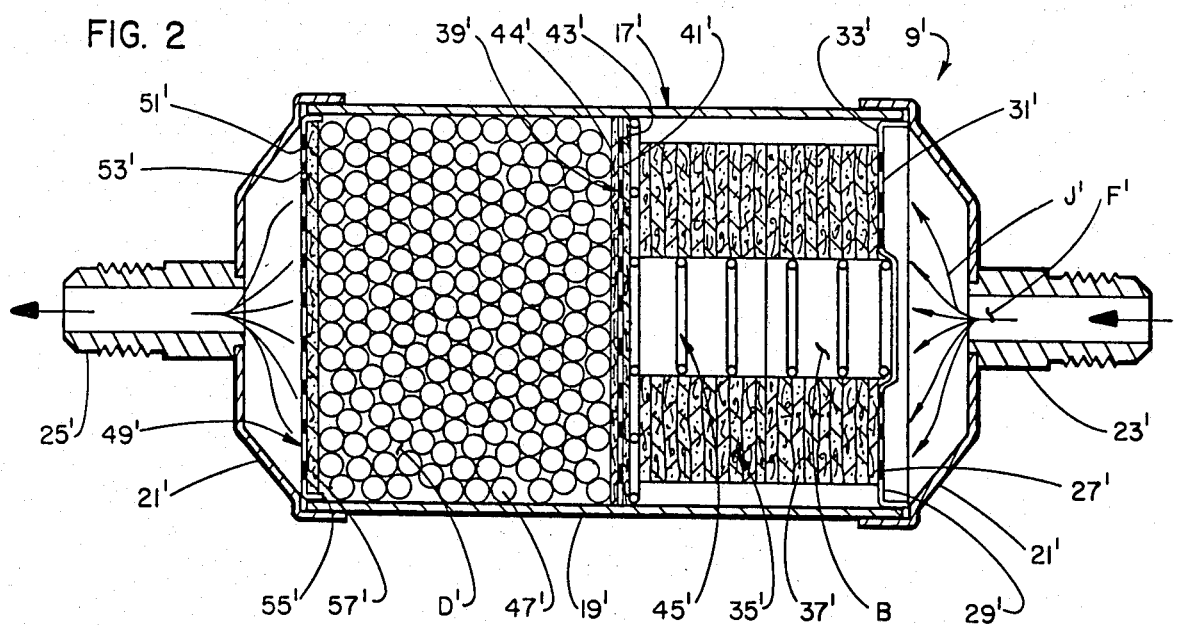
FIG. 2 is a longitudinal cross-sectional view of an alternative embodiment of the filter drier unit of the present invention.

At the downstream end of desiccant bed D, a perforate support plate 49 is provided with this downstream support plate having a plate body 51 and a plurality of perforate holes 53 therethrough. The downstream support plate is further provided with an outer flange 55 which is adapted to be secured in place relative to the outlet (i.e., lefthand) end of shell body 19, as shown in FIGS. 1 and 2. A second filter pad 57 of suitable inorganic fibrous material is provided on the upstream face of plate body 51 of perforate support plate 39 and the downstream face of desiccant bed D bears against the second or downstream filter pad.

With the filter drier of the present invention assembled as above-described and with shell heads 21 sealingly secured in place on shell body 19, it will be understood that compression coil spring 45 bearing against diffuser plate 27 (which is fixedly secured in axial position relative to housing 17) exerts a compacting force on desiccant bed D by means of the intermediate divider plate 39 thereby to maintain the desiccant beads in a compacted state. An optional filter pad 44 may be provided between the back face of plate 39 and the upstream face of desiccant bed D so as to cushion the desiccant beads 47 and so as to fill any voids formed by the irregular, upstream face of the desiccant bed as it bears against plate 39. Filter pad 44 cushions the upstream desiccant beads 47 relative to the moveable plate 39.

As liquid refrigerant enters housing 17 via inlet 23 in the form of a jet J of liquid refrigerant, the liquid refrigerant jet expands as it enters the housing 17 which is of considerably larger cross-section than the liquid refrigerant line and is further physically diffused by means of diffuser plate 27. It will be noted that filter 35 is upstream from desiccant bed D and the diffused jet J of liquid refrigerant flows in substantially uniform fashion through filter 35 thus exposing substantially more cross-sectional area of the filter to the liquid refrigerant than in the case of prior art filters which permitted a jet of liquid refrigerant to impinge directly on the upstream face of the filter.

Moreover, as the liquid refrigerant exits filter 35, a substantially uniform, diffused flow of the refrigerant enters desiccant bed D via perforate holes 41 in the intermediate perforate divider plate 39 such that the liquid refrigerant effectively comes into contact with a greater portion of the cross sectional area of desiccant bed D and thus exposes a greater amount of surface area of the desiccant bed to a uniform flow of the liquid refrigerant thus enhancing the adsorption properties of desiccant beads 47.

As previously pointed out, the downstream perforate support plate 49 is fixedly secured relative to housing 17 and provides an immovable support for the downstream face of desiccant bed D. It will thus be noted that the momentum forces of liquid refrigerant jet J impinging on the first perforate diffuser plate 27 and on filter 39 cooperates with the resilient biasing force of spring 45 thereby to increase the compaction force on diffuser bed D and to minimize the tendency of desiccant beads 47 to move relative to one another within the desiccant bed. Moreover, because the flow of liquid refrigerant is highly diffused by the diffuser plate 27, by intermediate diffuser plate 39, by filter 35, and by filter cushion 44, there is little tendency of the desiccant beads 47 to be moved relative to one another by the diffused flow of liquid refrigerant therethrough. Thus, movement or roiling of the desiccant beads and the tendency of the desiccant beads to erode is substantially reduced.

It will also be appreciated that the unfiltered, liquid refrigerant encounters filter 35 before it is encounters desiccant bed D. By removing particulate material from the refrigerant before passing the refrigerant over the desiccant bed, it is insured that particulate material does not cover the desiccant beads which would reduce the effective adsorbtive surface area of the desiccant.

As previously noted, intermediate diffuser plate 39 is movable axially within housing 19 and is biased toward the desiccant bed by means of compression spring 45. Because intermediate plate 39 is movable axially within the housing, and because filter pads 37, 43, and 44 are not constrained in axial direction, upon the flow of liquid refrigerant through the filter drier unit 9, the momentum of the liquid stream entering housing 17 from inlet 23 acts to further compress filter 35. Upon startup and shutdown of the refrigeration system 1 in which filter drier 9 of the present invention is installed, the starting and stopping of the flow of refrigerant causes axial compression and relaxation of filter 35 which results in a scrubbing action of the filter, and which allows some of the particulate dirt which has been entrapped on the first few upstream filter pads 37 to be shed from these first upstream pads. Upon restarting the refrigeration system, this scrubbed off particulate dirt is entrapped by downstream pads 37 of filter 35 thus substantially increasing the particulate dirt retention capacity of filter 35 without a substantial increase in the pressure drop across the filter drier. Further, the service life of filter drier unit 9 is extended.

It will also be noted that the downstream or second filter 43 constituting the last filter pad of the upstream filter 35 extends fully across the width or diameter of cylindric housing 19 and is permanently compressed by spring 45 against the intermediate diffuser plate 39 thereby to insure that any dirt which is scrubbed off filter 35 by the above-described compression and relaxation of the filter is positively maintained upstream from desiccant bed D and is prevented from entering the desiccant bed. Thus, this last downstream filter pad 43 effectively prevents particulate dirt from bypassing filter 35. Also, filter cushion 44 extends fully across housing 19 and serves as a backup filter to filter 43 to prevent particulate dirt from entering the desiccant bed.

Likewise, filter 57 on the downstream face of the desiccant bed D extends across the full width or cross section of housing 19 and effectively prevents any desiccant particles which may become dislodged with the flow of liquid refrigerant therethrough from being discharged from the filter drier unit 9 of the present invention.

Referring now to FIG. 2, an alternative embodiment of the filter drier unit of the present invention is indicated in its entirety by reference character 9' with the primed reference characters indicating corresponding parts having a corresponding function as the parts above described in regard to filter drier unit 9 shown in FIG. 1. Thus, a detailed description of the operation and construction of the various components of this alternate embodiment will not be provided.

In short, the primary difference between filter drier unit 9' and filter drier unit 9 heretofore described is the fact that compression coil spring 45' is located within an axial bore B provided through the center of filter pads 37' constituting the upstream filter 35'. The upstream end of spring 45' is in engagement with the center portion of perforate support plate 27′ and is engageable with the downstream last filter pad 43′ of filter 35′ thereby to resiliently bias the intermediate diffuser plate 39′ toward desiccant bed D′.

In accordance with the method of filtering liquid refrigerant of the present invention, it will be noted that a jet of liquid refrigerant is flowed into a filter housing 17 from an inlet 23 with this housing 17 having a substantially larger cross-sectional area than the liquid refrigerant line 7. The jet J of liquid refrigerant is diffused so as to extend substantially uniformly across the entire cross section or width of housing 17. Then, the liquid refrigerant is filtered by an upstream filter 35. The filtered, diffused liquid refrigerant is then passed over a bed of desiccant D and is exhausted from the housing as by means of an outlet 25. The advantages derived from the above-described method of treatment were heretofore described in regard to the operation and advantages of filter drier unit 9 and thus will not be repeated in detail.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

I claim:

1. A method of filtering liquid refrigerant in a refrigeration system, said system comprising a compressor for receiving refrigerant vapor and for compressing it to an elevated pressure, a condensor for rejecting heat from said compressed vapor, an evaporator for absorbing heat from its surroundings, and a thermostatic expansion valve between said condensor and said evaporator for expanding said refrigerant, said method comprising the steps of:

between said condensor and said evaporator, first directing a jet of said refrigerant into a filter drier, said filter drier having a housing having an inlet and an outlet;

then, diffusing said jet as it enters said filter drier;

then, passing said diffused jet of refrigerant through a primary filtering means, said primary filtering means comprising a plurality filter pads stacked in face-to-face relation;

then, passing said refrigerant through an intermediate perforate support plate;

then, passing said refrigerant through an upstream fibrous filtering pad, said upstream pad being of a fibrous filtering media extending transversely across the full cross section of said filter drier housing, said intermediate plate and said upstream pad being axially shiftable within said filter drier;

then, passing said refrigerant through a bed of desiccant media comprising a multiplicity of desiccant beads;

passing said refrigerant through a downstream fibrous filtering pad;

then, passing said refrigerant through a downstream perforate support plate for discharge from filter drier housing via said outlet; and resiliently compacting said desiccant bed between said upstream and downstream filtering pads thereby to maintain said desiccant beads in a compacted state even when the flow of said jet of refrigerant is alternately started and terminated so as to substantially prevent movement of said beads relative to one another upon the start-up and shut down of said compressor.

2. The method of claim 1 wherein, during operation of said refrigeration system, alternately compressing and releasing the compression of said primary filtering means upon the start-up and shut down of the flow of liquid refrigerant through said filter drier so as to dislodge particulate matter entrapped on said primary filtering means and to entrap said dislodged particulate matter on another portion of said primary filtering means prior to coming into contact with said desiccant bed.

3. A filter drier for installation in a liquid line of a refrigeration system, said filter drier comprising a housing having a shell and a shell end at each end of said shell, an inlet, an outlet, and a flow path for the flow of liquid refrigerant through said housing from said inlet to said outlet, a bed of desiccant media including a multiplicity of desiccant beads within said housing adjacent said outlet, downstream filter means between said desiccant bed and said outlet, downstream perforate support means, the latter being fixed relative to said downstream shell end against axial movement toward said outlet for holding said desiccant bed and said downstream filter means in position within said housing and for permitting the flow of liquid refrigerant from said downstream filter means to said outlet, intermediate perforate support means within said housing on the upstream side of said desiccant bed, said intermediate perforate support means being movable axially within said housing and being positioned upstream from said desiccant bed, upstream filter means disposed between said desiccant bed and said intermediate perforate support means, primary filter means between said intermediate perforate support means and said inlet, said primary filter means having a primary filter body, upstream perforate support means between said primary filter means and said inlet for diffusing a jet of liquid refrigerant discharged from said inlet substantially across the width of said shell at the upstream end thereof so that said diffused stream of refrigerant flows through said primary filter means, said upstream perforate support means being fixed relative to said upstream shell end against axial movement toward and away from said inlet, said downstream and upstream filter means each comprising one or more suitable pads of fibrous filtering media extending transversely across substantially the full cross section of said housing, and a compression spring interposed between said upstream perforate support plate and said intermediate perforate support means for applying a resilient, compacting force on said desiccant bed between said upstream filter pad and said downstream filter pad thereby to maintain said desiccant bed in a compacted state even when the flow of said refrigerant is alternately started and stopped so as to substantially prevent movement of said beads relative to one another, said spring being free of said primary filter body such that said primary filter body is substantially free of axial compaction by said spring.

4. A filter drier as set forth in claim 3 wherein said primary filter means includes a plurality of filter pads stacked in face-to-face relation constituting said primary filter body and a last filter pad opposite said inlet, said last filter pad extending across substantially the entire cross section of said housing while the other pads constituting said primary filter body being of a cross sectional area somewhat less than the cross section of said housing, said filter pads constituting said primary filter body being alternately compressed and released upon startup and shutdown of the flow of liquid refrigerant whereby particulate matter entrapped on the upstream pads of said primary filter body is dislodged upon the axial compression and elongation of said primary filter body and is then entrapped by said last filter pad of said primary filter means thereby to increase the dirt retention properties of said primary filter means.

* * * * *